350-392 SR CROSS REFERENCE SEARCH ROO
XR 3,015,693

X 2574

Jan. 2, 1962 H. W. VOLBERG ETAL 3,015,693

OPTICAL PROJECTION OF A CATHODE RAY TUBE IMAGE

Filed Oct. 29, 1958

INVENTORS.
HERMAN W. VOLBERG,
LAURENCE R. BEACH.
BY Carl R. Brown
ATTORNEY.

3015693
OR IN 350/232

United States Patent Office 3,015,693
Patented Jan. 2, 1962

3,015,693

OPTICAL PROJECTION OF A CATHODE RAY TUBE IMAGE

Herman W. Volberg and Laurence R. Beach, San Diego, Calif., assignors to General Dynamics Corporation, Rochester, N.Y., a corporation of Delaware Filed Oct. 29, 1958, Ser. No. 770,420
5 Claims. (Cl. 178—7.87)

The present invention pertains to a system for the optical projection of images formed on cathode ray tubes and more particularly is directed to a unique optical and light projecting system capable of projecting images directly from the screen of a cathode ray tube into displays on an external projection or recording system.

There are systems in use which are capable of projecting images normally presented on the screen of a cathode ray tube to an external light modulated display. These systems are generally either quite complex or provide only an inferior or delayed display of cathode ray tube images. The projection on a light responsive screen of images being simultaneously projected on a cathode ray tube screen, has proven to be a very difficult operation. To accomplish this purpose both direct and indirect systems have been tried. Also in an attempt to reduce the complexity of the systems and the components required, it has been necessary in some instances to provide systems which are capable of only an intermittent interrogation of the images projected on the screen of a cathode ray tube. But all such avenues have proven to be quite complicated, expensive and many times unreliable.

The present invention comprises a simplified system for projecting, by means of a light beam, any type of images that may be initiated on the screen of a cathode ray tube. The images may include television, radar, shaped beam images, storage tube images, and the like. The system is capable of providing a high intensity illumination on an external screen of the images projected on the screen of a cathode ray tube. The displays are continuous and instantaneously depict the images being projected in the cathode ray tube. Also the system is capable of providing shaded displays commensurate with the shading present in the cathode ray tube images.

The system of this invention generally comprises a cathode ray tube having a screen coated with a transparent material, identifiable as Kerr effect material. This coating, when activated by an electron beam, has an electrical field set up across its thickness. This field lies normal to the surface of the Kerr effect material and alters the optical properties that the material presents to the passage of light therethrough. When polarized light is passed through an activated coating of Kerr effect material, at any angle to the surface of the material, the polarization of the light beam will be disrupted. This disruption of the polarized light beam is often stated as giving the beam a circular polarization.

The system utilizes a light projecting unit capable of projecting a collimated beam through an angularly positioned cathode ray tube screen, having a coating or layer of Kerr effect material thereon, to a lens system capable of forwarding the resulting beam to a visual display unit or a suitable recording unit. On either side of the cathode ray tube screen, in the path of the collimated beam, is positioned polarizing lenses. These polarizing lenses are so oriented, that their respective acceptance planes are normal to each other. When the light source projects the collimated beam through the first of the polarizing lenses and through the cathode ray tube screen, the second polarizing lens prevents passage of the beam to the lens of the display unit. However, when an electron beam is projected onto the Kerr effect material, the coating on the screen has set up therein an electrical field. This field alters the optical properties of the Kerr effect material at the point of contact by the electron beam. The Kerr effect material so activated, when at angles with the passage of a beam of light polarized in a particular plane, causes the polarization of the light beam intersecting the activated portion to be disrupted. When the disrupted portion of the collimated beam reaches the second polarizing lens, it no longer has a polarization than is at 90° with the angle of acceptance of the second polarizing lens. Accordingly, this portion of the beam is not blocked by the second polarizer, but passes on to the display unit.

The invention permits a continuous and simultaneous display on an external unit of images projected on a cathode ray tube screen, since there is no necessity to interrupt the projection of light periodically through the screen of the cathode ray tube as required in indirect projection techniques using film or electrostatic storage apparatus. Further, the brilliancy of the collimated light source may determine the brilliancy of the display projected to the display or recording unit. The system is simple and provides a minimum of parts to accomplish the very intricate process of displaying information from a cathode ray tube on an external screen.

Accordingly, it is an object of this invention to provide a simple system capable of providing direct projection to an external display or recording unit of information imaged on the screen of a cathode ray tube.

Another object of this invention is to provide a light projection system capable of projecting information imaged on a cathode ray tube screen into a composite and continuous display that occurs simultaneously with the occurrence of images on the screen of the cathode ray tube.

It is another object of this invention to provide a system for projecting a collimated light beam that may be interrupted in accordance with images projected on the screen of a cathode ray tube.

Other objects and many of the intended advantages of this invention will be readily appreciated as the same becomes better understood by reference to the following detailed description when considered in connection with the accompanying drawings in which like reference numerals designate like parts throughout the figures thereof and wherein.

Figures 1, 2:
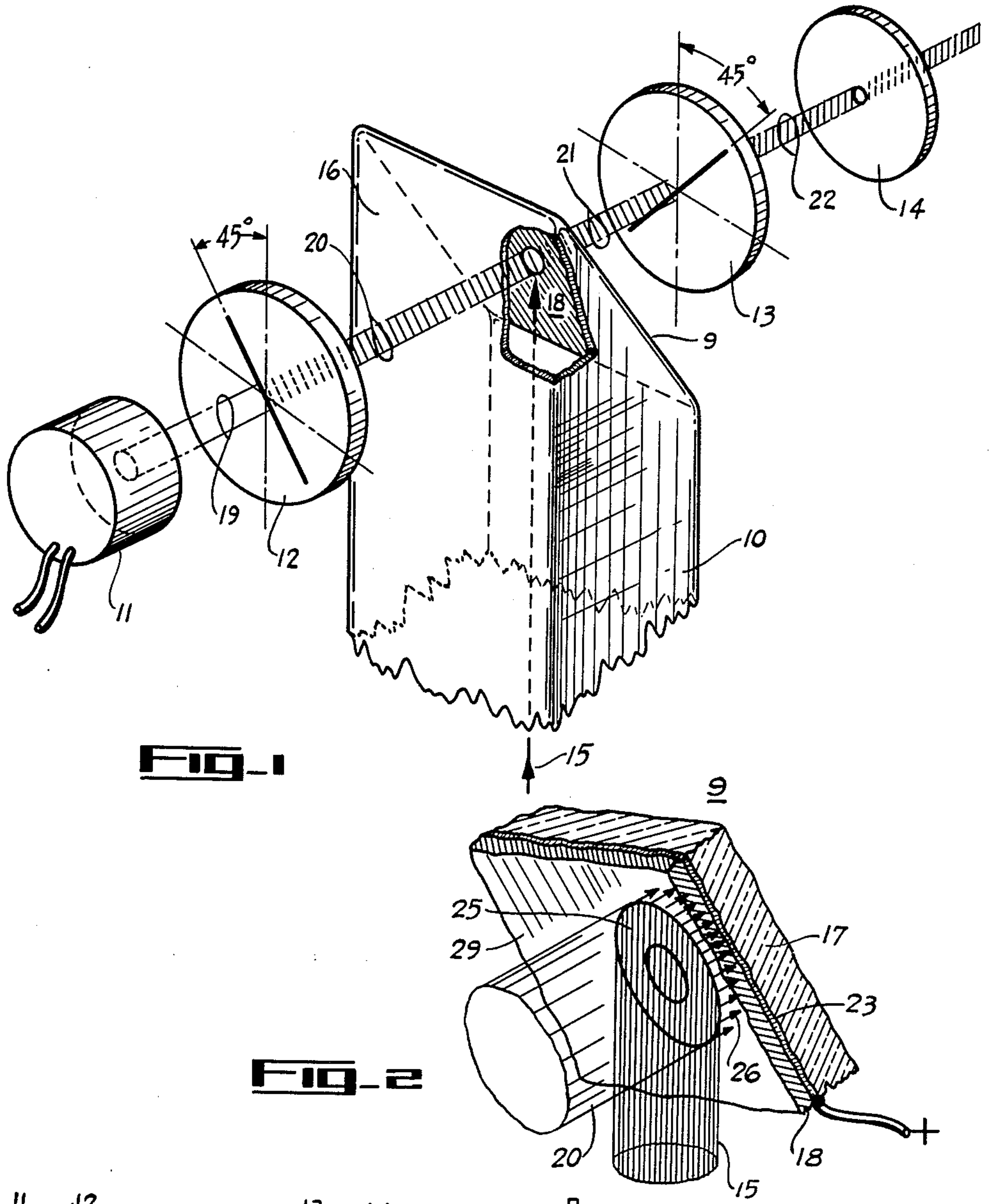
FIGURE 1 illustrates in perspective the arrangement of an exemplary embodiment of this invention.
FIGURE 2 illustrates in cross section a section of the cathode ray tube screen used in the invention.

Referring now to the drawings wherein like reference characters designate like or corresponding parts throughout the several views, there is shown in FIGURE 1 a cathode ray tube 10 capable of imaging on its screen 9 coordinated display information such as television, radar, character displays, storage tube displays, or any type of images capable of being projected on cathode ray tube screens. The evacuated tube 10 may be constructed of glass, metal, or like materials used in the art. At the screen end 9, the tube 10 has an optically flat surface portion 16 that lies in a plane perpendicular to the path of the light beam 20. This portion of the tube 10 is transparent and will pass a beam of light therethrough. The screen 9 of the cathode ray tube 10 also has a transparent enclosing shell 17, which lies at an angle of approximately 45° to the axis of the light beam, and is capable of readily passing a beam of light. While the angle of shell 17 is 45° in the exemplary embodiment other angles may be used as will become more clear later. The inner surface of screen 9 that is contacted by the electron beam, see FIGURE 2, is coated with a transparent conductive material 23 and a layer of material 18 that may be generally designated as Kerr effect material. The Kerr effect material is subject to direct impact by the electron beam.

For the purpose of explaining the operation of the invention a shaped electron beam 15, of the type normally projected in shaped beam cathode ray tubes, is shown projected on the screen 9 in the form of a character image of the numeral 0. Upon impact of the composite electron beam 15 with the Kerr effect material 18, there is created on the surface 29 of the Kerr effect material a negative potential. The transparent conductive layer 23 is connected to a positive potential source and accordingly has a positive potential. When the electron beam 15 contacts the surface of the Kerr material 29 and creates in the area 25 thereof a negative charge, a difference in potential then exists between the surface area 25 and the conductive layer 23. This difference in potential causes an electrical field 26 to be established across the Kerr effect material in the aforesaid area 25 for a period of time dependent upon both the persistence of the Kerr effect material used and the time the electron beam 15 is applied to the area 25. The potential source on the conductive layer 23 serves to complete the electrical circuit established by the electron beam. Generally the electrical field 26 has lines of potential that are normal to the surface of the screen.

Figure 3:
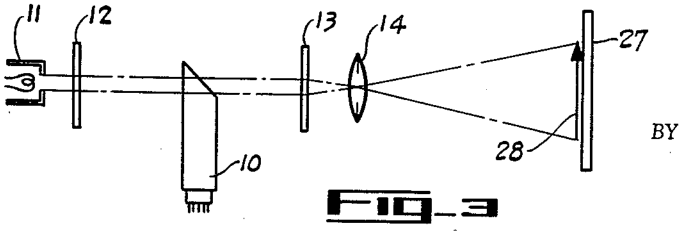
FIGURE 3 illustrates the operational organization of the preferred embodiment shown in FIGURE 1.

With reference to FIGURE 1 a collimated light beam 19, provided by light source 11, is projected through a polarizing lens 12 in a manner to pass through and impinge upon either the entire area of the screen 9 or those portions of the area desired. The exemplary embodiment in FIGURES 1 and 2 illustrates only a narrow beam 19 for the purpose of a simplified illustration of the invention. However, it is intended that the beam projected by light source 11 has sufficient cross section to cover the entire screen of a cathode ray tube, if desired. The beam thereafter passes through a second polarizing lens 13 to a lens system 14, for projection on an external screen 27 as shown in FIGURE 3. The polarizing means 12 is so arranged about its axis that it has an angle of acceptance at approximately a 45° angle counterclockwise with the longitudinal axis of the cathode ray tube. Accordingly the light beam 20, which results from the collimated light beam 19, occupies the angle of acceptance as determined by the first polarizing means 12 when it has passed through lens 12 and is not changed in polarization as it passes through the flat surface of the tube 16 and through the electro-responsive screen 17 to the second polarizing unit 13. The second polarizing unit 13 has an angle of acceptance that is approximately 45° in a clockwise direction from the longitudinal axis of the tube. The angle of acceptance of the second polarizing unit thus is at an angle of 90° with respect to the acceptance plane of the first polarizing unit. Accordingly, in the normal passage of the collimated light beam through the two polarizing units, the 90° offset of the acceptance planes of the first and second polarizing units is sufficient to block the passage of any light from light source 11 to the projection lens 14. Therefore in the normal operation of the system, when there is no electron beam applied to the screen 17 of the cathode ray tube 10, no light will be permitted to pass through the two polarizing units from light source 11 to the lens system 14.

When an electron beam image is projected on the screen 9 of the cathode ray tube 10 as shown in FIGURES 1 and 2, lines of electrical potential 26 are set up across the Kerr effect material. The potential lines 26 will lie at approximately a 45° angle with the collimated light beam 20 passing through the screen 17. The angle of the screen 17 with respect to both the longitudinal axis of the tube and to the line of path of the collimated beam is normally 45°. However, the angle of inclination may be varied as is appropriate and still be within the scope of the invention. For images on the cathode ray tube screen, such as when using a shaped electron beam, intentional distortion may be introduced into the beam shape to correct for overall system distortion. However, the 45° angle permits an equalization of the distortion incurred in that the screen intercepts the electron beams at an angle of incidence equal to the collimated light beam angle of incidence. Since the screen is at an angle of 45°, the potential lines 26 across the Kerr effect material will also be at a 45° angle with respect to the line of passage of the collimated beam through the screen. The polarized condition of the light beam 20 caused by polarizing unit 12 is altered in its contact with and passage through that portion of the Kerr material activated by the lines of potential 26. That portion of the light beam so contacting the Kerr effect material is given a somewhat circular polarization. Therefore the light beam 21 that has passed through the screen of a cathode ray tube on which images have been projected, has certain portions of the light beam which have a circular polarization, with the rest of the light beams having that polarization imparted to it by polarizing unit 12. In passing through the second polarizing unit 13, the circular polarized portions of light beam 21 are now in a plane of acceptance and are passed to the lens system 14 while the passage of the rest of the light beam is stopped. Thus the portion of the light beam corresponding to the images on the screen of the cathode ray tube is capable of passing through to the display lens system 14 and being projected on the screen 27 in a corresponding upright display 28.

The thickness of the Kerr material 18 will generally be that thickness required to set up the lines of potential and provide a cross sectional surface to the light beam that will break up polarization of the beam as aforesaid and still be transparent. The response of the Kerr effect material may be slow or fast, as desired, depending upon the material used. Generally it is desirable to obtain a high speed response with a low voltage. This thus permits rapid changing of the display in the continuous projecting unit. A Kerr effect material that will afford this type of response is barium titanate which when operated at or above the temperature of 100° C. is capable of a response time of approximately 50 microseconds while requiring only a low control voltage. Depending upon the intensity of the light source 11, in most instances the light beam is capable of causing the screen of the tube and thereby the Kerr effect material to attain a temperature of 100° C. However, if the intensity of the beam is not sufficient to cause the Kerr effect material to attain the desired temperature, then a direct metal connection to the screen of the tube from the light source itself may be provided permitting conduction heating to the screen of the tube and thereby providing the necessary temperature control. Also an external temperature control unit may be provided to maintain the correct temperature of the Kerr effect material. In the specific embodiment the polarizing units are shown as separate from the cathode ray tube. While this provides for easier adjustment and construction, it would also be within the scope of the present invention to place the polarizing units in the transparent glass of the cathode ray tube.

In summary, the system operates as follows. A high intensity light source 11 directs parallel light rays 19 along the optical path 19, 20, 21 and 22. On passing through the first polarizer 12, the light beam becomes polarized in the acceptance plane as shown. It is then directed into the cathode ray tube 10 where it passes through the Kerr effect material 18 on the inner face of the angled cathode ray tube screen 17. If there is no electrical field in the Kerr effect material 18, resulting from an electron inscribed image or spot thereon, the polarized light beam is not affected by the Kerr effect material but passes on, still polarized in the acceptance plane of the first polarizer 12. On reaching the second polarizer 13, the light beam is completely attenuated since the plane of acceptance of the second polarizer is at 90° to the first polarizer. Thus substantially no light passes through the second polarizer 13. Now if the electron beam in the cathode ray tube 10 is directed against the Kerr effect material 18, as shown in FIGURES 1 and 2, an electrical field is set up in the Kerr effect material 18. The optical properties of the material so stressed are altered such that the portion of the plane of the polarized beam 20 passing through this area has its polarization broken up or given what is called a circular polarization. On reaching the second polarizer 13 the components of the circular polarized beam parallel to the acceptance plane of the second polarizer 13 pass through and form a bright image of the image on the cathode ray tube screen. A projection lens 14 is then focused on the second polarizer 13 and the bright image becomes the object for the projection system as shown in FIGURE 3. An enlarged optical image is then available for projection onto a receiving screen 27.

Obviously many modifications and variations of the present invention are possible in light of the above teachings. It is therefore to be understood that within the scope of the appended claims the invention may be practiced otherwise than as specifically described.

What is claimed is:

1. In combination, a cathode ray tube having an electron beam and a screen, means for projecting a collimated light beam polarized in a predetermined acceptance plane toward and through said screen, said light beam being directed obliquely to said screen, said screen being constructed of a plate of transparent non-conductive material having a layer of transparent Kerr effect material fixed thereto with a layer of transparent electrical conductive material sandwiched therebetween, said conductive material being connected to a potential source, said electron beam being capable of contacting the surface of said Kerr effect material creating an electrical field between said surface of said Kerr effect material and said electrical coating across the thickness of said Kerr effect material corresponding to the delineated surface portion directly contacted by said electron beam, the optical properties of said delineated Kerr effect material being varied in response to said field thereby disrupting the polarized condition of said polarized light passing at said angle therethrough, a polarizing means having an acceptance plane normal to the polarized condition of said light beam passing toward said screen for intercepting said light beam after passing through said screen selectively activated by said electron beam and for passing only said portion of said light beam having a polarization disrupted by said activated Kerr effect material.

2. In combination, a cathode ray tube having an electron beam and a screen, means for angularly projecting a collimated light beam through said screen, first polarizing means positioned between said projecting means and said screen for intercepting said light beam and passing light rays onto said screen only in a predetermined polarized acceptance plane, said light beam being directed obliquely at said screen, said screen being constructed of a plate of transparent non-conductive material having a layer of transparent Kerr effect material fixed thereto with a layer of transparent electrical conductive material sandwiched therebetween, said conductive material being connected to a potential source, said screen being so positioned that said electron beam is capable of contacting the surface of said Kerr effect material on its surface opposite to said conductive material causing a potential differential to arise between said surface of said Kerr effect material and said electrical coating across the thickness of said Kerr effect material corresponding to the delineated surface portion directly contacted by said electron beam, said potential differential across said portions of said Kerr effect material causing the optical properties of said delineated Kerr effect material to be altered, said altered portions of said Kerr effect material being capable of disrupting the polarized condition of light passing therethrough at an angle to said material and to said potential difference, a second polarizing means having an acceptance plane to polarized light that is normal to said plane of said first polarizing means for intercepting said light rays passing through said screen, said second polarizing means intercepting and substantially preventing the passage of said light rays being polarized in a plane corresponding to said first polarizing means but passing said light rays having a polarization disrupted by said activated portions of said Kerr effect material, and means for projecting said light rays passed by said second polarizing means to a display means.

3. In a system capable of optical projection of images formed on the screen of a cathode ray tube by an electron beam, comprising in combination, a cathode ray tube screen having a layer of Kerr effect material, means for projecting a light beam polarized in a given acceptance plane through said layer of Kerr effect material, said layer being positioned in a plane at an angle of the order of 45 degrees to the path of said light beam, means for projecting said electron beam upon said layer along a path substantially normal to the path of said light beam, said Kerr effect material disrupting the polarized condition of portions of said light beam passing through said screen in areas where said electron beam contacts said Kerr effect material, polarizing means positioned in the path of said light beam and having an angle of acceptance normal to the angle of acceptance of said light beam contacting said screen for passing said portions of said light beam whose polarized condition has been disrupted by said screen and for substantially preventing the passage of the remainder of said beam.

4. In an optical projection system, comprising in combination, means for projecting a light beam along a desired path and polarized in a predetermined plane, a cathode ray tube including a screen, means in said tube for projecting electrons to cause displays on said screen, said screen being positioned at approximately at 45 degree angle to the path of said electrons, said screen including a layer of Kerr effect material capable of being selectively activated by said electrons for disrupting the polarization of predetermined portions of said light beam passing therethrough in accordance with said displays inscribed on said Kerr effect material, said layer of Kerr effect material being arranged to intersect said path of said light beam at approximately a 45 degree angle, and polarizing means for blocking portions of said beam passing through said Kerr effect material that is polarized in said predetermined plane and for passing said predetermined portions of said beam along said path.

5. A system capable of projecting images to a light display means of images projected on the screen of a cathode ray tube, comprising in combination, a light source means for providing a light beam, cathode ray tube means having an electron beam and a screen positioned at approximately a 45 degree angle to the path of said electron beam, said screen being positioned in the path of said light beam with the surface of said screen arranged at approximately a 45 degree angle to said path, first polarizing means positioned in the path of said beam between said screen and said light source for projecting said light beam in only a predetermined polarized acceptance plane through said screen, said screen including means for interrupting the polarized condition of portions of said light beam passing through said screen in areas where said electron beam contacts said screen, a second polarizing means positioned in the path of said beam and having an angle of acceptance normal to the angle of acceptance of said first polarizing means for passing said portions of said light beam whose polarized condition has been interrupted by said screen and for substantially preventing the passage of the remainder of said light beam, and projection means for displaying the portions of said light beam passing through said second polarizing means.

References Cited in the file of this patent

UNITED STATES PATENTS

| | | |
|---|---|---|
| 2,188,661 | Knoll | Jan. 30, 1940 |
| 2,277,008 | Von Ardenne | Mar. 17, 1942 |
| 2,481,622 | Rosenthal | Sept. 13, 1949 |

FOREIGN PATENTS

| | | |
|---|---|---|
| 442,381 | Great Britain | Feb. 7, 1936 |
| 445,106 | Great Britain | Sept. 13, 1936 |

OTHER REFERENCES

"The Electron Beam as a Light Relay," published in Television and Short-Wave World, January 1939, page 25. Copy in Division 41.